US010810303B1

(12) United States Patent
Grier (10) Patent No.: US 10,810,303 B1
(45) Date of Patent: Oct. 20, 2020

(54) APPARATUS AND METHODS FOR SELECTIVE LOCATION AND DUPLICATION OF RELEVANT DATA (71) Applicant: Jonathan Grier, Pikesville, MD (US)

(72) Inventor: Jonathan Grier, Pikesville, MD (US)

( * ) Notice: Subject to any disclaimer, the term of this patent is extended or adjusted under 35 U.S.C. 154(b) by 1027 days.

(21) Appl. No.: 14/821,765

(22) Filed: Aug. 9, 2015

Related U.S. Application Data (63) Continuation-in-part of application No. 14/253,129, filed on Apr. 15, 2014, which is a continuation-in-part of application No. 14/059,410, filed on Oct. 21, 2013.

(60) Provisional application No. 61/769,606, filed on Feb. 26, 2013.

(51) Int. Cl.
*G06F 21/52* (2013.01)
*G06F 16/9032* (2019.01)
*G06F 17/40* (2006.01)

(52) U.S. Cl.
CPC .......... *G06F 21/52* (2013.01); *G06F 16/9032* (2019.01); *G06F 17/40* (2013.01)

(58) Field of Classification Search
CPC ................. G06T 7/0081; G06T 1/0007; G06T 2207/10004; G06F 21/50; G06F 21/52
See application file for complete search history.

(56) References Cited

U.S. PATENT DOCUMENTS

| | | | |
|---|---|---|---|
| 6,813,682 B2 | 11/2004 | Bress | |
| 7,159,086 B2 | 1/2007 | Bress | |
| 7,941,386 B2 | 5/2011 | Bousqet et al. | |
| 8,219,588 B2 | 7/2012 | Walia et al. | |
| 8,458,805 B2* | 6/2013 | Adelstein ................ | H04L 63/14 713/187 |
| 9,442,975 B2* | 9/2016 | Weber .................... | G06F 21/552 |
| 2004/0250133 A1* | 12/2004 | Lim ...................... | G06F 21/554 726/23 |
| 2004/0260733 A1* | 12/2004 | Adelstein .............. | H04L 63/123 |
| 2007/0139231 A1* | 6/2007 | Wallia ................ | H04L 63/1408 341/50 |
| 2008/0195543 A1* | 8/2008 | Turner ................... | G06Q 10/10 705/50 |
| 2009/0138453 A1* | 5/2009 | Jee .......................... | G06F 16/10 |
| 2009/0307251 A1* | 12/2009 | Heller ................. | G06F 17/3015 |
| 2010/0235392 A1* | 9/2010 | McCreight .......... | G06F 21/6209 707/780 |
| 2011/0072489 A1* | 3/2011 | Parann-Nissany ...... | G06F 21/62 726/1 |
| 2012/0102571 A1* | 4/2012 | Sheldon .............. | G06F 21/6218 726/26 |
| 2012/0150915 A1* | 6/2012 | Choi ..................... | G06Q 30/02 707/802 |
| 2012/0209983 A1* | 8/2012 | Bronner ................ | G06F 9/4843 709/224 |
| 2012/0254203 A1* | 10/2012 | Stewart ............... | G06F 21/6209 707/755 |
| 2013/0117273 A1* | 5/2013 | Lee ......................... | G06F 16/22 707/741 |

(Continued)

*Primary Examiner* — William Spieler
(74) *Attorney, Agent, or Firm* — FisherBroyles LLP; Richard M. Lehrer (57) ABSTRACT

Apparatus and methods are provided for performing a digital forensic investigation. Aspects of the apparatus and methods select data on a data source and mark and/or copy this selected data to a storage device in a forensically sound manner. Information related to the location of the selected data may also be stored on the storage device.

46 Claims, 7 Drawing Sheets

(56) References Cited

U.S. PATENT DOCUMENTS

| | | | |
|---|---|---|---|
| 2014/0059313 A1* | 2/2014 | Hwang | G06F 11/1435 711/162 |
| 2014/0244582 A1* | 8/2014 | Grier | G06F 16/27 707/624 |
| 2014/0244699 A1* | 8/2014 | Grier | G06F 16/13 707/822 |
| 2014/0281331 A1* | 9/2014 | Weber | G06F 21/552 711/170 |
| 2015/0212758 A1* | 7/2015 | Lee | G06F 21/552 710/74 |

* cited by examiner

APPARATUS AND METHODS FOR SELECTIVE LOCATION AND DUPLICATION OF RELEVANT DATA

CROSS REFERENCE TO RELATED APPLICATIONS

This application is a continuation-in-part of and claims the benefit of the filing date of U.S. patent application Ser. No. 14/253,129 (the '129 application) entitled "Apparatus and Methods for Selective Location and Duplication of Relevant Data", which was filed on Apr. 15, 2014 and which is a continuation-in-part of and which claims the benefit of the filing date of U.S. patent application Ser. No. 14/059,410 (the '410 application) entitled "Apparatus and Methods for Selective Location and Duplication of Relevant Data", which was filed on Oct. 21, 2013 and which claims the benefit of the filing date of U.S. provisional patent application No. 61/769,606 entitled "Apparatus and Methods for Selective Location and Duplication of Relevant Data", which was filed on Feb. 26, 2013, by the same inventor of this application. The '129 application, the '410 application and the provisional application are each hereby incorporated by reference as if fully set forth herein.

FIELD OF THE INVENTION

The invention relates generally to copying of electronic data and more particularly to apparatus and methods for selectively locating and replicating, in a forensically sound manner, selected data from a data source.

BACKGROUND OF THE INVENTION

A digital forensic investigation is an investigation of a digital source (also referred to herein as a "data source") such as a computer, computer peripheral, video camera, still image camera, smartphone, video gaming device, network, network device, hard-drive, floppy disk, CD, DVD), non-volatile memory (Flash, USB drive, thumb drive, built-in Flash), volatile memory (RAM), or any other digital storage device to determine the state of and/or events related to the data, using procedures and techniques which duplicate that information in the fashion it was stored on the device, in such a way that not only is the information preserved, but the fashion by which it is stored is also preserved. Typical applications of digital forensic investigations include law enforcement investigations, electronic discovery (e-discovery) in civil cases, incident responses such as to data theft, etc.

A digital forensic investigation typically begins with receipt of an assignment and a determination of which data/information the investigator is being charged with finding. In other words, the investigator is informed and/or can determine from experience what criteria to use to determine if information will be "relevant" to an investigation. Since different investigations may have different objectives and/or requirements, information that is relevant in one investigation may or may not be relevant in another investigation. Relevance is thus specific to an investigation. Relevance may also be a relative concept such that data may fall within a range somewhere between completely irrelevant and very relevant to a specific issue or sub-issue.

The next step in a conventional digital forensic investigation is imaging: the investigator makes a bit-for-bit copy of the entire data source (including relevant, irrelevant and empty data) in a forensically sound manner. The image is guaranteed to be an identical duplicate, without modification, of the original system, in a form which can be analyzed and investigated. Conventional imaging is done using existing, specialized hardware and software (e.g. forensic duplicators, forensic bridges, forensic write blockers and imaging software).

Recent technology trends have caused a surge in the number and storage capacity of data sources, however, the speed of imaging devices has not kept pace with the increased capacity. As a consequence of this imbalance, the amount of time required to create a forensic image has been growing to a point where it is becoming impractical.

In view of the foregoing it would be advantageous to provide methods for improving the speed of a digital forensic investigation. It would be advantageous to provide apparatus for performing efficient forensic digital investigations.

BRIEF SUMMARY OF THE INVENTION

Many advantages will be determined and are attained by the invention, which in a broad sense provides apparatus and methods for identifying and/or duplicating, in a forensically sound manner, data from a data source. Aspects of the invention provide methods and apparatus which examine a data source, locate selected data and copy or mark the data and information associated with the data (e.g. metadata used to locate and/or interpret the data, location information related to the data, etc.) to a storage device (which may or may not be the data source) using forensically sound techniques.

A method may be provided for creating a forensic image of at least a portion of a data source, wherein the data source is divided into blocks and data is stored in at least one of the blocks. The method includes associating an agent with the data source. The agent receives at least one command to perform at least one forensic operation on the data source. The agent, in response to receiving the at least one command, determines at least one block which may contain the identified data and performs the forensic operation on the at least one block which may contain the identified data. The agent does not perform the forensic operation on at least one other block.

A method may be provided for preserving at least a portion of a data source, such that the data source is separated into blocks. The method includes associating an agent with the data source. The agent receives an information criteria and in response to receiving the information criteria, identifies data stored on at least one block of said data source. The agent copies the at least one block to a storage device but does not copy at least one other block of the data source.

A method may be provided for identifying, on at least a portion of a data source that is separated into blocks, which blocks contain data responsive to an information criteria. The data source includes an interface. The method includes, subsequent to identifying the information criteria, providing an agent to monitor access to the blocks. The method further includes the agent identifying one or more of the accessed blocks as containing data responsive to the information criteria.

A method may be provided for preserving at least a portion of a data source, wherein the data source is separated into blocks, and wherein the data source includes an interface. The method includes identifying information criteria and subsequent to identifying the information criteria, providing an agent to monitor access to at least some of the blocks. The agent duplicates all accessed blocks.

BRIEF DESCRIPTION OF THE DRAWINGS

For a better understanding of the invention, reference is made to the following description and examples, taken in conjunction with the accompanying drawings, in which like reference characters refer to like parts throughout, and in which.

The invention will next be described in connection with certain illustrated embodiments, examples and practices. However, it will be clear to those skilled in the art that various modifications, additions, and subtractions can be made without departing from the spirit or scope of the claims.

DETAILED DESCRIPTION OF THE INVENTION

Apparatus and methods are provided for imaging a digital data source to create a forensically sound copy/duplicate/replica/image/archive/preservation/transmission (these terms are used interchangeably herein and may be referred to as a forensic operation). A forensically sound duplicate includes the information needed to perform low level forensic analysis of the data, recover deleted or slack data, analyze file system metadata and timelines, and perform other types of digital forensic analysis and store it on a storage device. In other words, the complete, exact, device level blocks may be preserved, and not just the higher level interpretation of their contents. Likewise, the identification of these blocks are also preserved. Additionally, in one or more embodiments, not only is the selected data or contents preserved, but the supporting data or metadata which allows for the location, identification, parsing, interpretation, execution, or other interaction with of such data is also preserved; additionally, metadata describing the file (such as the time of creation, permissions, access control list, time of last access, mime or media type, etc.) may also be preserved. For example, a simple copy function of a Word file only copies the contents of the file, but not the full contents of the blocks of the storage device which contain these contents (e.g. the fashion by which the file is stored in these blocks, the location of these blocks, and their arrangement will be lost), whereas one or more embodiments of the invention stores the full contents. Likewise, a simple copy function of a Word file only preserves the file's contents, and not the parts of the storage device which identify the location of the file, metadata which describe the file, etc., but one or more embodiments of the invention stores this additional data.

While the data source can be any digital data source, for ease of explanation the following description will be limited to a computer hard-drive. However, those skilled in the art will recognize that the invention is not so limited and the description may be easily adapted for other devices and such adaptation is within the understanding of those skilled in the art.

As used herein, the following terms (capitalized or not) shall have the following meanings with the caveat that in the event that multiple meanings are provided for a term, whichever meaning is more appropriate for the reference and whichever provides a broad scope for the reference but does not cause the reference to be ambiguous or rendered obvious by existing references shall govern:

"Agent" or any variation thereof—shall mean software or code loaded onto the storage device that has the capability to perform forensic identification and/or duplication of selected data either alone or in combination with another device. It may also refer to an adjunct device that is physically and/or electrically connected to the storage device, which has the capability to access the storage device for the purpose of performing forensic duplication of selected data and/or to a remote device which may communicate with the storage device via a network connection or some other wireless or wired connection to the storage device.

"Data Source"—a digital source such as a computer, computer peripheral, video camera, still image camera, smartphone, video gaming device, network, network device, hard-drive, floppy disk, CD, DVD), nonvolatile memory (Flash, USB drive, thumb drive, built-in Flash), volatile memory (RAM), or any other device which contains information, where it is desired to duplicate that information in the fashion it was stored on the device, in such a way that not only is the information preserved, but the fashion by which it is stored is also preserved. May also be referred to as a digital source.

"Data"—metadata (data that provides information about other data) and/or a file containing data and/or data stored in a format other than a file, email files, executable files, document files, unused data (typically a sequence of binary 0's or bytes for which the file system has no knowledge of their actions) and various other file and data formats.

"File"—a conventional file format or any group of data that is associated together for a common meaning or purpose. Each of these terms may be employed interchangeably and shall be deemed to have the definition appropriate to the situation.

"Block"—a division of a storage device (e.g. grains, regions, sectors, clusters, address ranges, byte ranges, or any subdivision of the storage). A Block may be a natural unit of storage in use by the storage device (e.g. sector), an abstraction over such units (e.g. clusters), a unit created by one or more embodiments of the invention (e.g. grain), or any other division, grouping, or range scheme. When referring to different Blocks, they need not be identical in size or attribute.

"Block Identifier ('ID')"—Typically identifiers include sector number, cluster number, block number, grain number, byte number, memory address, device address, offset or any other method of identifying the block and depend on the data source. While not conventional for forensic investigations, the inventor contemplates that other identifiers may include file path and file name, or universal resource locator (URL) in certain circumstances. The ID is likewise typically expressed in a format that the storage device can natively and unambiguously retrieve. However, the Block ID need not be stored explicitly, as long as sufficient information is stored which allows unambiguously calculating or determining the location. For example, instead of storing a sector number, it may suffice to store a "sector group" or "region" number along with the number of sectors which make up one sector group/region; likewise, it may suffice to simply store sector data in a specified order allowing inference of the sector number based on position of that sector's data.

State 1—blocks that are allocated.
State 2—blocks that were previously allocated.
State 3—blocks which have never been allocated.
Selected data—data that has been determined to be relevant or otherwise worth forensically duplicating.
Relevance—relevance may be specific to a particular investigation or a particular set of circumstances. Relevance also need not be absolute (i.e. there can be different levels or degrees or probabilities that something is relevant). Thus blocks may be prioritized based on their degree of relevance with high priority blocks being imaged before low priority blocks. Additionally, the priority levels may be recorded to aid in subsequent paring down of the image and/or to provide an audit trail.
To the extent that any definition conflicts with the above definitions, the above definitions control so long as doing so would not overly narrow the scope of a claim or overly broaden the scope of a claim such that the claim would be considered ambiguous or invalid.

Figure 3:
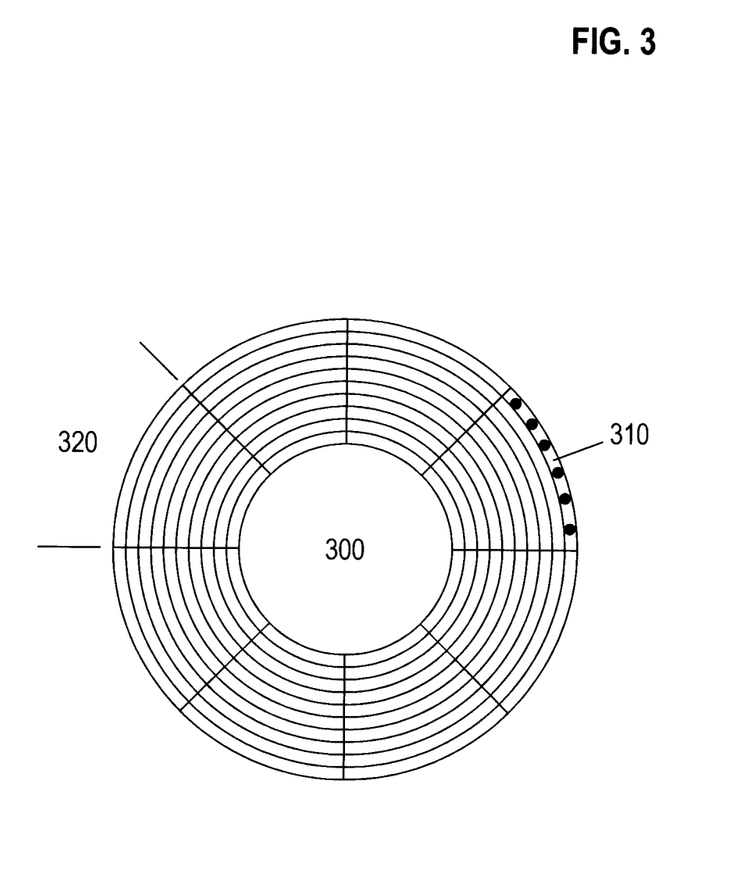
FIG. 3 is a diagram of a digital data source in accordance with one or more embodiments of the invention.

A typical data source, such as a computer hard-drive (as illustrated in FIG. 3), stores data. One or more aspects of the invention limit(s) the imaging to selected data stored on the data source. This may be achieved by identifying and/or locating, accessing and analyzing metadata and using the metadata to find additional data that is selected for the investigation, then duplicating and storing the metadata, the selected additional data and additional selected data. It may also or alternatively include parsing a file and learning from the parsed file the location and/or identification of additional data.

Figure 4:
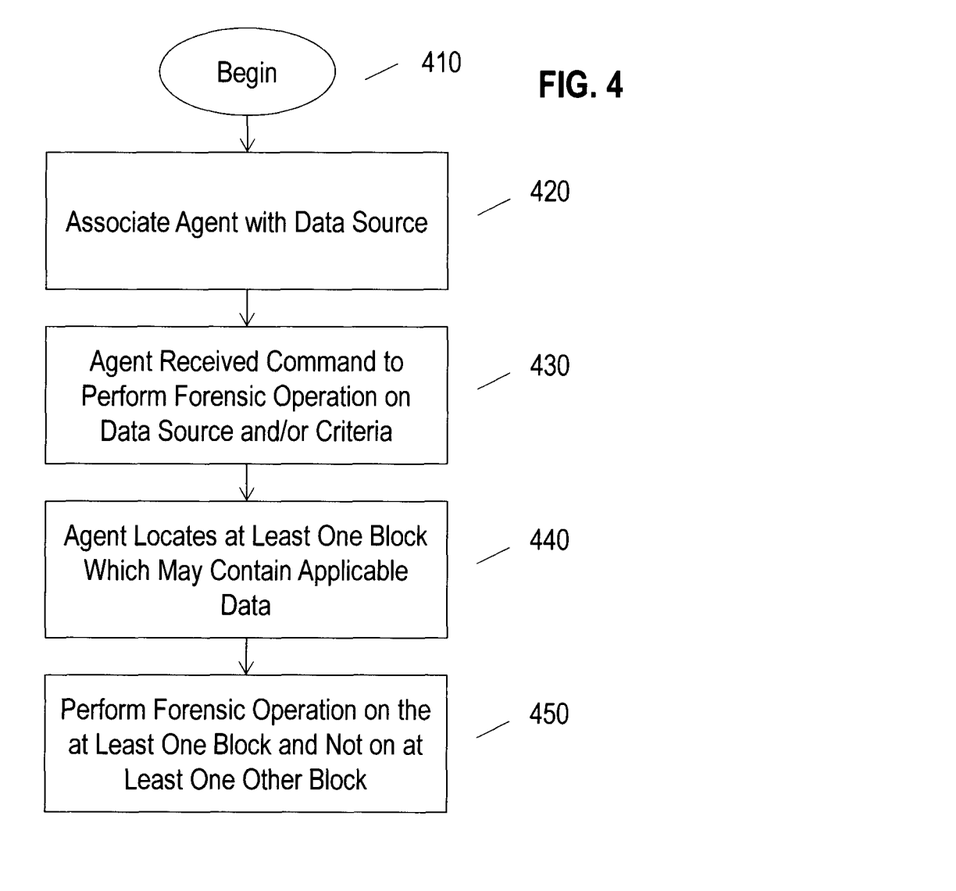
FIG. 4 is a flow chart of a method of performing a digital forensic investigation in accordance with one or more embodiments of the invention.
Figure 5:
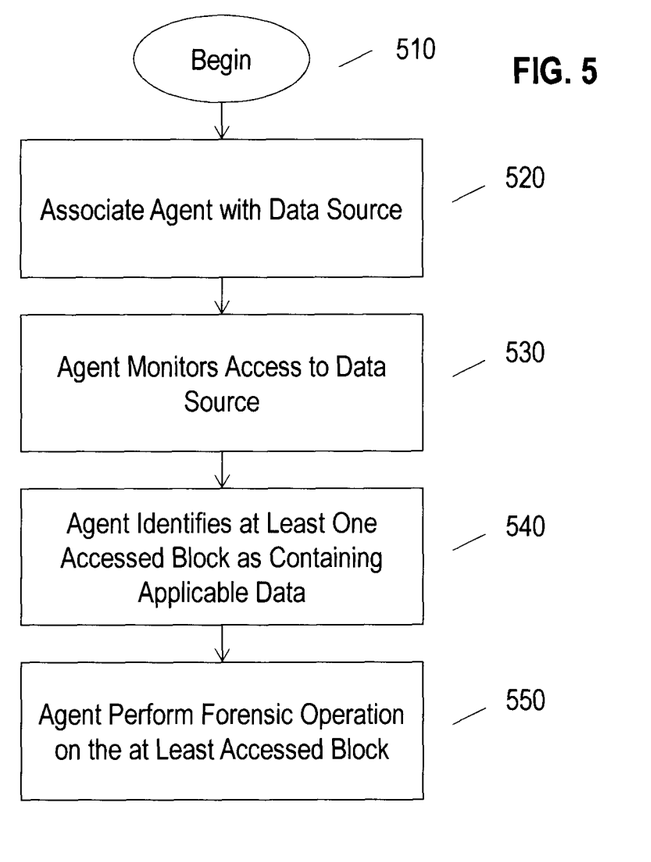
FIG. 5 is a flow chart of a method of performing a digital forensic investigation in accordance with one or more embodiments of the invention.

Criteria for determining data to select may need to be configured for each duplication effort 430. Often the criteria may be configurable based on parameters, fields, predicates, mathematical expressions, algebraic expression, file name(s), file path(s), file extension(s), file properties, file type(s), MIME type(s) and string regular expressions. Additionally or alternatively, all information read by an investigator, or automated software or hardware monitoring tools may be selected for duplication and duplicated. The examiner could mark types of files or specific files as selected or not, etc. External sources may be used to determine which data to select (e.g. the memory may first be analyzed forensically, and that may be fed into the agent and used to select data). An agent or method configured in accordance with one or more embodiments of the invention may be configured to collect everything except that which is deemed irrelevant 420, 520. Alternatively, it could be configured to only collect that which is deemed relevant. The difference between these two approaches relates to how items are processed when there is uncertainty about the relevance.

Figure 1:
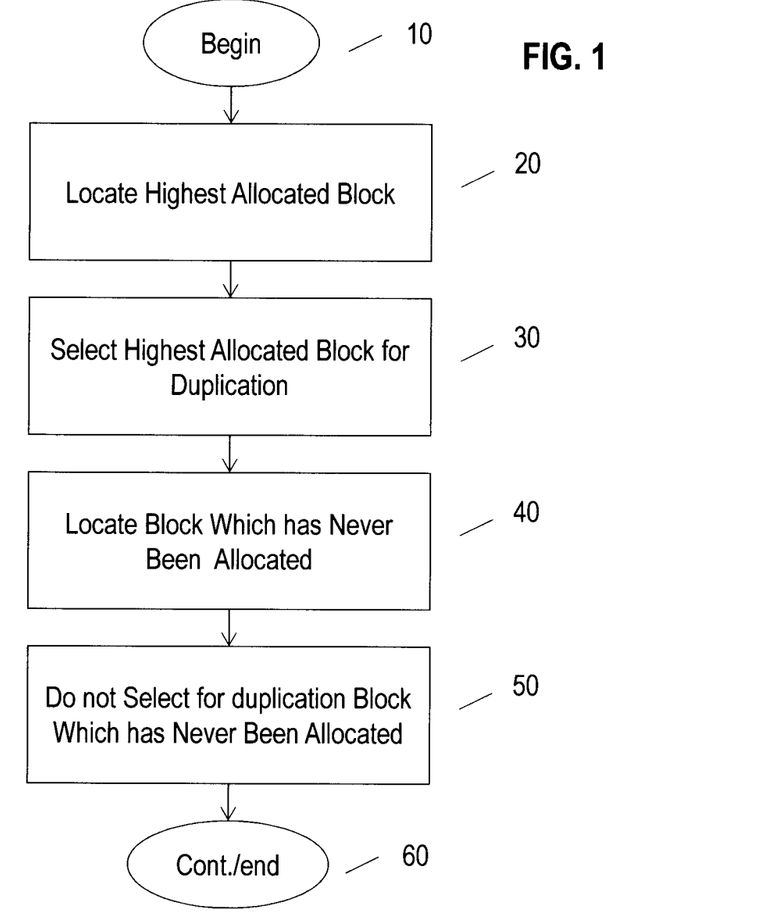
FIG. 1 is a flow chart of a method of performing a digital forensic investigation in accordance with one or more embodiments of the invention.
Figure 1A:
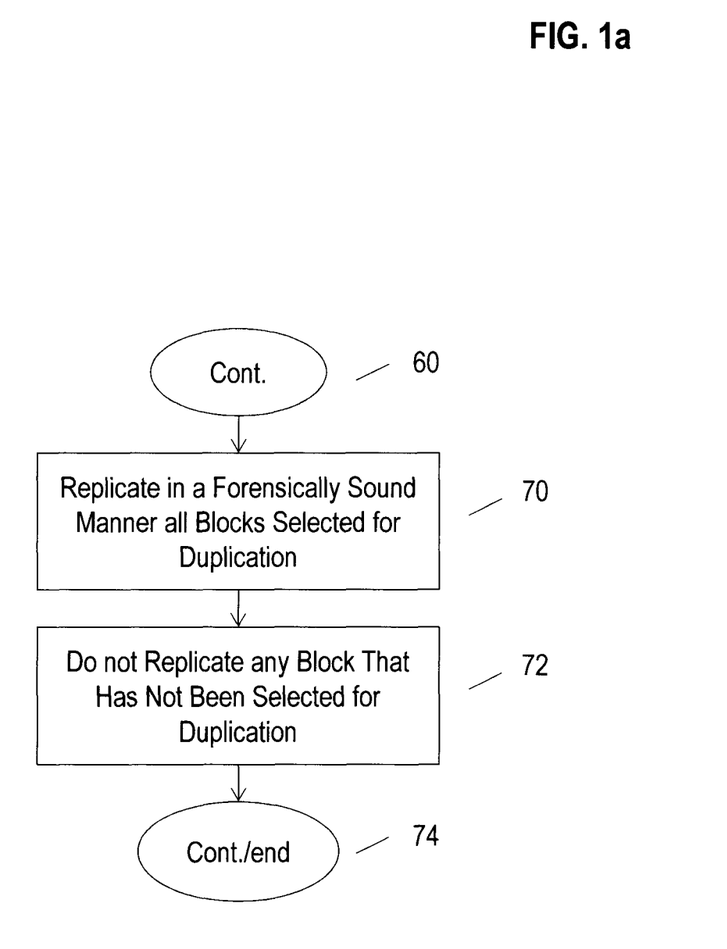
FIGS. 1a-1b are flow charts of additional methods of performing a digital forensic investigation in accordance with one or more embodiments of the invention.
Figure 1B:
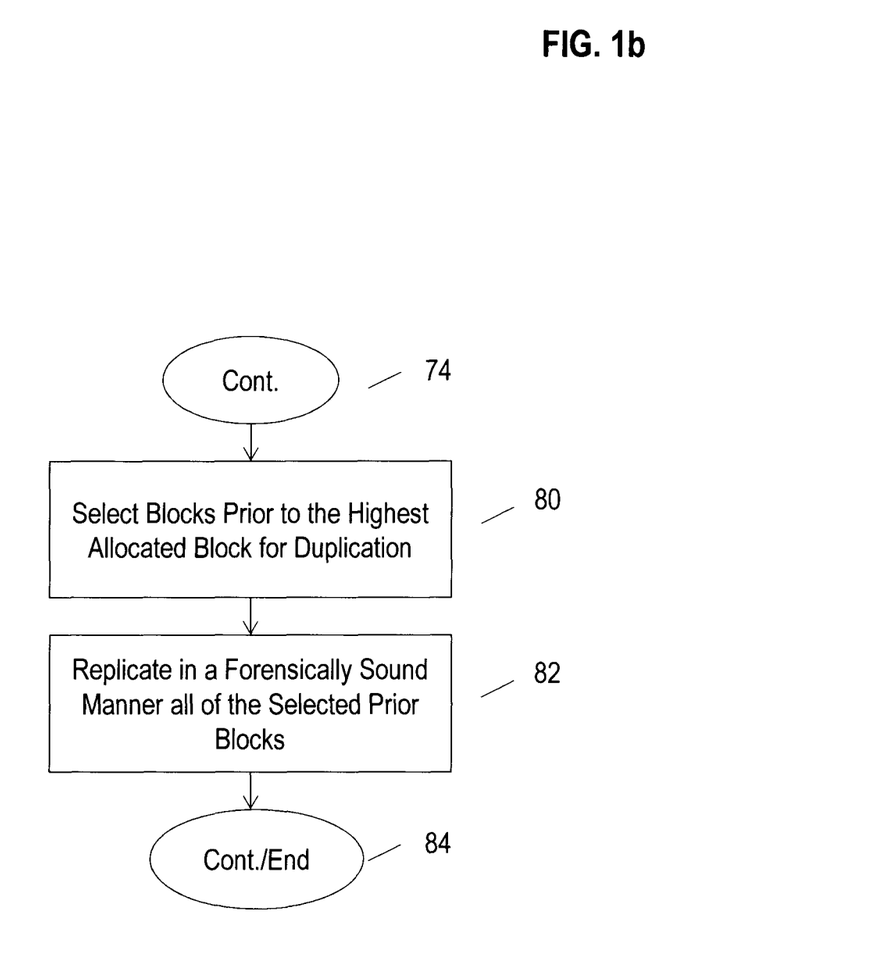

One or more aspects of the invention attempt(s) to collect everything within the data source (FIGS. 3-300) except that which is deemed irrelevant. One of various possible ways to accomplish this (as illustrated in FIGS. 1, 1*a* and 1*b*) is to duplicate parts of a disk that have been allocated (used to store current or deleted data)(FIG. 1*a*-70), and to not duplicate parts of the disk that may not have ever been allocated (never used to store data) (FIGS. 1*a*-72). In some instances, the metadata present in the device will explicitly indicate the state of various blocks (FIG. 3-310, 320). For example, the new technology file system (NTFS) $Bitmap file, in conjunction with other volume and NTFS metadata, indicates blocks that are currently allocated ("State 1"). The NTFS Master File Table (MFT) in conjunction with other volume and NTFS metadata indicate blocks that are in State 1, and sometimes indicate blocks that were previously allocated ("State 2"). This NTFS data may be parsed using conventional techniques.

In one or more instances, the hardware or storage device itself will contain such metadata. For example, Flash drives routinely store the allocation status of different blocks of the drive, to enable wear leveling and error correction and other benefits. In these cases, the agent can simply query and parse this metadata to determine allocation status.

However, in some instances, metadata indicating allocation status is incomplete or unavailable or not in a known format. Depending on the design choice these blocks can be selected or not. For example if the image is to support file carving (i.e. reconstruction of files whose data is present but whose metadata is deleted) blocks that are likely to have data, but which are lacking metadata are identified and larger blocks which encompass the blocks that are likely to have data are selected. Other techniques may be employed to determine which blocks to select. Metadata is typically available to determine which blocks are in State 1. However, information is not always available to determine which blocks are in State 2 versus which blocks have never been allocated ("State 3"). Metadata often does not distinguish the two. However, blocks are normally allocated in order (referred to herein as the order of storage). Thus, if it can be determined that a block X is either in State 1 or State 2 (FIGS. 1-20) then it can be assumed that every block <X is in State 1 or State 2 (FIGS. 1*b*-80). Further if it can be determined that X is the highest numbered block in State 1 or State 2 (FIGS. 1-20) then it can also be assumed that every block >X is in State 3 (with certain exceptions which will be discussed herein)(FIG. 1-40, 50). Therefore, the agent may duplicate all blocks through block X (FIG. 1*a*-70, FIGS. 1*b*-82), but not duplicate any block higher than block X (FIG. 1*a*-72).

In one or more embodiments, the agent may be configured to add a margin of error. For example, if it is definitively determined that block X is the highest block in State 1 or State 2 and if blocks X+1 through X+k may be in State 2 but there is a question, then these blocks X+1 though X+k may be duplicated as well. The value of k may be a constant, or it may vary based on the disk size, or other statistical properties of the disk, the data, the filesystem, or the metadata.

The agent may also or alternatively perform sampling of the blocks (using binary search, random samples, or other algorithms). If the data in a sampled block contains anything other than the factory default (which is usually binary NULLs) that indicates that the block is not in State 3. Conversely, if the data in a block is the factory default, it may indicate that the block is in State 3. Consequently, by sampling individual blocks, the device may determine which blocks are likely to be in which allocation state. Additionally, the device may sample blocks with block numbers that are larger than the expected largest block number of the disk in the off chance that the disk is larger than expected.

Those skilled in the art will recognize that these methods can be used recursively and in repeated combination with each other. For example, the agent may use metadata to determine that blocks 0 to X are in State 1 or State 2, then sample blocks >X to determine that blocks X to Y (where Y>X) may be expected to also be in State 1 or State 2. Optionally, a margin of error is then added. Assuming that blocks 0 to Y+k may be in State 1 or State 2, then perform additional sampling to determine additional blocks that may be in State 1 or State 2, repeating any or all of the steps as needed or desired.

There may be times when blocks are used out of order (i.e. the order of storage is not sequential from block 0 or 1, depending on the numbering scheme, though block X; where X is the last block of the data source). For example, NTFS will often store a backup copy of the MFT ($MFT-Mirr) in the middle of the storage device. One or more embodiments of the invention may have explicit knowledge of these situations, and compensate for them. For example, one or more embodiments may determine that if block A is allocated, every block <A is presumed to be in State 1 or State 2, unless block A is in use by data, such as $MFTMirr, which is typically allocated out of order. Likewise, the ext3 filesystem places certain critical metadata throughout the disk, allocating these blocks out of order. The device may contain this knowledge and process accordingly, as described. These known files of metadata may be duplicated and stored together with the rest of the duplicated data, stored separately or not duplicated.

An alternative to assuming that if block X is in State 1 or State 2 then all blocks <X are also in one of those states, one or more embodiments may assume that any block within a certain proximity "d" to a block X that is in State 1 or State 2 is also in a similar state (similar to the above described margin of error). For example, as an alternative, if it is determined that block X is in State 1 or State 2 then block X−d through X+d will also be in State 1 or State 2. The value of d may be fixed, but may also depend on the device, the data, the filesystem, and/or their statistical properties. For example, if large blocks are found to be allocated (State 1 or State 2), d should be large, whereas if only small blocks are found to be allocated (State 1 or State 2), then d should be small. Those skilled in the art will recognize that +d and −d need not be the same value and still fall within a scope of one or more claims.

In one or more embodiments the invention may incorporate more detailed knowledge of the algorithm and scheme by which blocks on the disk and/or filesystem are used (i.e. the order of storage), and, by reversing that algorithm, may determine likely allocation states of different blocks. By way of a non-limiting example, a filesystem has the property that it first allocates blocks 1-1000, then blocks 5000-6000, then blocks 1001-4999, then 6001 to the end of the disk. The agent determines, either from the filesystem metadata or by sampling, that block 1200 is in State 1 or State 2. As a result, the agent identifies blocks 1-1000, 5000-6000 and 1001-1200 as being in State 1 or State 2 based on its knowledge of the allocation algorithm. The agent then duplicates at least blocks 1-1000, 5000-6000 and 1001-1200.

In addition to or alternatively, an investigator could be allowed to manually examine the system, or run automated hardware or software tools or these tools may be invoked by the agent or system (without an investigator), or be caused to run in any other way, or just autonomously run. The tools employed for manual or automated examination may be incorporated into the invention or may be employed in conjunction with the invention. One or more embodiments of the invention may then monitor the blocks of the disk that are read 530. Anything that the investigator and/or the tool(s) read(s) can be selected and duplicated 540,550. This can be done in parallel, serially, at entirely different times or instead of other methods. By way of a non-limiting example, one or more embodiments of the invention run(s) a conventional triage tool, such as osTriage, or ADF, and monitor(s) 530 the blocks of the disk that are read. Some or all of these blocks are then duplicated 540, 550. By way of another example, one or more embodiments allow(s) an investigator to inspect a storage device. This can be done locally, using live forensics tools, or remotely, using tools like F-Response or EnCase Enterprise. One or more embodiment(s) monitor(s) all blocks of the disk that are read and duplicates some or all of them 540, 550.

In another example, the agent may duplicate all blocks which are accessed regardless of how they are accessed during a specified time period 550. It may use capabilities already provided by the operating system, device driver, or storage device to perform this operation. Similarly, the agent may preserve all blocks necessary to perform a particular operation, or answer a particular query. The agent performs this operation, or determines the answer to a particular query, or instructs another system (such as the operating system or an application) to do so, and monitors the set of all blocks accessed in the course of such operation or query. The agent concludes that this set is a superset (or improper superset) of the necessary blocks to perform the operation or query. The agent then preserves or duplicates this set. For example, the command may be to preserve all blocks necessary to locate and present a particular Word document "employee.docx". The agent may fulfill this command by first monitoring all access of the storage device(s), and then reading the contents of the employee.docx Word file. In doing so, many blocks will be accessed, including all blocks containing data of the Word file, blocks containing metadata necessary to find, parse, or interpret the Word file (such as the MFT master file table, and the directory index data), and other blocks. The agent monitors all of these accesses and preserves all of these blocks and information related to these blocks.

A possible technique for implementing the above approach is to create an agent device, which acts as an interface to the disk but also monitors all reads or other accesses done through the agent device. It then duplicates all read or otherwise accessed blocks. It may be useful for the agent device to ignore or reject write commands. By way of a non-limiting example, suppose there is a source disk, and an operating system, such as Windows™ or Linux™, which has the ability to read the source disk. There is also an agent (e.g. software), such as a device driver, which creates a virtual disk, which the operating system presents as another disk. This agent allows the operating system and applications to read the virtual disk. When a read command is received, the agent reads the corresponding data from the source disk and duplicates the data (and typically/optionally the surrounding block). When a write command is received, it is either executed, ignored or it may generate an error. Optionally, multiple virtual disks may be created, with different behaviors for each. For example, the agent may give priority to read requests done to one virtual disk over requests to other virtual disks. Optionally, when a read request is received for data in a location that has already been duplicated, the agent returns the duplicated data instead of the original data. Thus, the duplication may act as a cache. Alternatively, read requests may be done normally regardless of the number of times data in the same location is read. One or more embodiments will monitor these requests (e.g. by hooking the operating system or device driver), keep track of and duplicate the blocks that are read. It may be useful to do both of these or just one. One or more embodiments may just monitor the requests and identify which blocks make up the data (e.g. it may just return a list of block IDs). One or more embodiments may copy all such data and not track the blocks (e.g. it may just copy and preserve the accessed data). This would be especially useful for a data source that for some reason could not be divided into blocks. In addition, or alternatively, one could create an access method from scratch (e.g. write filesystem access code to query the device, interpret the filesystem, etc.) and log or identify the blocks.

While it is useful to store a partial image in a file (or some other appropriate storage format), an association between data and its location on the source device should also be preserved for a forensically sound copy. In one or more embodiments, large blocks of data may be stored together. For instance, a page of 32,768 sectors may be stored together as one block. In this case, instead of storing the sector number of each sector in a page, it suffices to store the sector number of the first sector in the page. Given any sector number x, the sector number of the first sector in x's page may be computed by setting x's 15 least significant bits to zero (e.g. if the page size is 32,768=2^15 sectors). This may improve speed in some embodiments, both by reducing the memory required and by retrieving data from the data source more efficiently. Storing entire pages also allows a simpler and more compact storage format, and may be of forensic benefit as well (e.g. since relevant data is typically stored in proximity to other relevant data, by copying entire pages relevant data that otherwise may not have been duplicated may be duplicated). Pages for blocks that for one reason or another were not copied to the image may be omitted or otherwise marked as absent. Alternatively, a page of null or dummy data, or another type of dummy page, can be used for omitted regions. Each omitted region may have its own null or dummy page, or one page can be used for multiple omitted regions.

Not all blocks will necessarily be stored at the same time. The file may be formatted to facilitate efficiently adding blocks. This may be achieved by allowing blocks to be stored out of order (e.g. new blocks may be appended to the end of the file—regardless of their location on the source disk). To facilitate out of order storage of blocks an index or table of contents (TOC) of blocks may be employed. The index or TOC stores an association between locations on the disk and pages within the file. These pages can thus be stored in the file in any order. New pages can be added by appending them to the end of the file, and updating the index or TOC. Additional metadata about each block (e.g. the prioritized relevance of the region, and the time of its collection) can be stored as well.

A non-limiting example of storing pages would be to use the Advanced Forensics Format (AFF), with each AFF page corresponding to a block of the source disk, with blocks of the source disk that are absent from the image having their corresponding page omitted from the index/TOC and the file, and with metadata stored in special dedicated segments (e.g. a segment containing a Block Map of highly relevant regions, and a segment containing a Block Map of moderately relevant blocks).

One or more of the above duplicate drives (images) may be reduplicated and/or further pared down using features disclosed in the '410 application. Images (both full and partial) tend to take up a lot of storage space and they may contain information or data that is off limits (e.g. attorney confidential) or otherwise undesirable. In such instances it may be useful to remove the unwanted data from the duplicate drive by creating a forensically sound duplicate of the duplicate which excludes blocks that are unwanted. Additionally or alternatively, the duplicated drive may be duplicated again (one or more times) using profiles, operator interaction/decisions, whitelists, blacklists or any other automated process to determine which of the already duplicated data is "relevant" for the further duplication and then only duplicate the selected data for that duplication. If the format permits, it may be possible to simply delete the unwanted data from the existing image. Likewise, if the original media is still available, additional blocks that were not originally duplicated, may be added either by reduplicating or by adding to the file if the format permits. By way of a non-limiting example, suppose the police seize a data source. An examiner determines, believes or is informed that the only information that will be relevant on the data source will be emails. The examiner then duplicates all blocks of the data source containing emails. As the case progresses, it is determined that that audio files may also be relevant. All blocks from the data source that contain audio files are then added to the image, either by adding to the original image file or by reduplicating and making a new image file with both the contents of the first image and the blocks containing audio files.

Data Collection:

Many data sources have known locations where they store metadata, which can be expected to be selected. Thus, during data collection metadata is located and temporarily stored (e.g. in a stack, queue, memory, storage, etc.) then analyzed to determine the location of additional data for duplication. Metadata (e.g. Master Boot Record, partition tables, partition maps, disk label, filesystem metadata, File Allocation Table (FAT), FAT Boot Sector, FAT32 FSINFO, directory files, New Technology File System (NTFS) Master File Table (MFT), MFT entries, $MFT File, $MFTMirr file, $Boot file, $Volume file, $Bitmap file, directory indexes, filesystem journals, etc.) are identified/located (e.g. by one or more device level identifiers such as location, sector number, block number, byte number, file path, file name, memory address, URL or any other device level identifier where the device may be queried for the particular identifier) retrieved, parsed and analyzed.

Typically the metadata will provide the location and characteristics of other data (e.g. metadata may identify, among other things, sector status—currently in use, deleted, never used, file name, creation date, file type, data type, whether the file was deleted or not, date of deletion, whether data is part of a file, whether data has been used or is irrelevant, dates of usage, size, encryption, owner, creator, etc.) that is stored on the data source. In those instances, the metadata is analyzed, and from analyzing the metadata, it is determined if the other data should be selected. If the other data is not relevant, the time required to retrieve it may be avoided. Additionally, or alternatively, some or all data may be read to determine whether or not it should be selected for duplication. If it is not relevant it may be omitted. While this may be more time consuming it is more accurate and may speed up analysis. Instead of omitting or avoiding it, one or more embodiments store data indicating that the block is deemed irrelevant such as in a Block Map. Likewise, one or more embodiments store a description of the block; in some cases, this may completely describe, or provide enough information to fully reconstruct, the block's data. Data may be deemed irrelevant or simply not selected for any number of reasons. By way of a non-limiting example, the device may have access to a database of hashes of known irrelevant data and/or blocks (These hashes are not necessarily of entire files), and compute a hash as it reads the storage device. If the hash of the data, or block matches the database, it is selected. If the data is all binary NULLs, it may be deemed irrelevant. If the data is constant, or of low entropy, it may be deemed irrelevant. In some cases, the hash or some other identifier may be stored instead, or a reference to the database may be stored; this allows future determination of the contents of the data or block.

Other times, the metadata or file will provide the location of additional metadata and/or file(s). In those instances, the additional metadata and/or files may be retrieved, parsed and analyzed as was the original metadata/file. This iterative process may continue until no additional metadata/file is located or it may be terminated at a point prior to such time. Those skilled in the art will recognize that the decision when to terminate is a design choice.

Selective Storage:

When the selected data is identified, duplicated and stored, the location/identifier that the data had in the data source is also stored. This location is stored in metadata which is stored in a manner associated with the copied data. The location or identifier should be sufficient to unambiguously retrieve the data from the storage device. It should also be sufficient to unambiguously assert the state of, at least some of, the device's data at the time of collection. So, in addition to, for example, recording a block number, it should record that block's contents, and associate them with that block number. Preferably the stored location includes sufficient information to retrieve the data from the storage device without the need for the iterative process performed on the data source. Storing a block number typically suffices for this purpose in most hard-drives. The location is likewise typically expressed in a format that the storage device can natively and unambiguously retrieve (e.g. sector number). However, the location need not be stored explicitly, as long as sufficient information is stored which allows unambiguously calculating or determining the location. For example, instead of storing a sector number, it may suffice to store a "sector group" or "region" number along with the number of sectors which make up one sector group/region; likewise, it may suffice to simply store block data in a specified order allowing inference of the block number based on position of that block's data.

Preferably the duplicated data is stored in the storage device in the same format (or in a compressed format—so long as the decompression algorithm is well established) that it is stored in the data source—or returned by the data source (the data source may store it in one format, but return it over its interface in a different one; depending on design choices, it may make sense to record either one). Each bit provided by the data source is stored, bit for bit. If the data source provides data in blocks, the exact contents of a block are stored—also the information to match those contents with their appropriate block number (i.e. the contents of block X need to be known thus the value of X needs to be known). For instance, if the data source returns a 512 byte sector, the identical sequence of 512 bytes is stored in the storage device. Storing such identical bit-for-bit copies of the data in the form provided by the data store ensures that the duplication is a forensically sound replica, which is repeatable, and subject to low level or device forensic analysis.

Often it will be useful to be able to store, transmit, or communicate a map of the disk that was duplicated, identifying properties of different blocks (e.g. which ones are relevant depending upon the granularity that you are looking for). This can be done via a map. A Block Map is a data structure in which: 1. all data on the disk (or all selected data on the disk) belongs to a known block and 2. a value or an implied value (e.g. enough information to enable the value to be recreated or otherwise determined) is stored for each such block. By way of a non-limiting example, initialize the value for all blocks to 0 and examine the sub-blocks in each block. If any sub-block in a block is selected, set the value of that block to 1 as that block should be selected. If no sub-block in a block is selected then the value of that block remains 0. As a result of the fact that any sub-block in a block makes the block worth selecting, once a sub-block is selected the remaining sub-blocks in that block need not be examined. Thus, starting with the first sub-block in the first block, if that sub-block is selected skip all remaining sub-blocks in that block and move to the first sub-block in the next block, if that sub-block is selected then set the value of that block to 1 and move to the first sub-block in the next block. Continue this analysis until all blocks (or all blocks of interest) are accounted for. If a sub-block is not selected then examine the next sub-block in that block and continue to do so until a sub-block is selected or all sub-blocks in the block have been examined. Those skilled in the art will recognize that that there are other ways to create a map and still fall within a scope of one or more of the below claims. For example, the determination of a selected block could require more than 1 selected sub-block, the value of a block could be based on the number or percentage of selected sub-blocks within the block. Additionally, when examining sub-blocks, all sub-blocks may be examined, or less than all sub-blocks could be examined in making the determination of whether to select a block. Additionally, a Block Map may be created without examining the actual sub-blocks. The methods described above and/or those described in the '410 application may be employed to predict which sectors or regions are to be selected. That predicted information may then be stored in the Block Map.

Once the map is established, to query if a particular block has been selected, the value corresponding to that block is examined. If the value is 1 (or some other predetermined value, greater than some predetermined value or less than some predetermined value depending on the design choice of the system), the block is relevant. If the value is 0 (or some other predetermined value, greater than some predetermined value or less than some predetermined value depending on the design choice of the system), the block is irrelevant.

The above described embodiment provides a block map set of 1s and 0s. It is useful to be able to express a block map as such. A set of 1s and 0s can be read, written, and spoken by humans; written down; printed out; and included in documents. As the above described example illustrates, it is possible to create a block map set of 1s and 0s by going through every block in order, and writing a 1 for selected and 0 for not selected. However, this may create a very large set. While not required, it is preferable to make the set more manageable by compressing the block map set then encoding the compressed set into a character encoding. This will represent the binary data as a series of characters. This series of characters may then be stored, displayed, printed transmitted or otherwise utilized and/or stored.

Compression can be done using any conventional lossless compression technique, such as Run Length Limiting (RLL), Lempel-Zev, DEFLATE, gzip, LZ4, etc. Compression techniques may be general purpose, or they may be specifically designed for this domain, or take advantage of properties of this domain. Since block maps tend to have large sets of identical values (e.g. a block that is selected is usually bordered by other blocks that are selected, and vice versa) Shannon's information theory can be used to compress the block map. A possible, but not the only, compression technique includes:

A. Start with the first block (current block).
B. Determine if the current block is selected. If so, store a binary 1 in the next RAM bit, otherwise store a binary 0 in the next RAM bit.
C. If selected, determine how many subsequent blocks in a row are selected. Store this total in X. For example, if the current block is selected, and the next 3 blocks are also selected, but the fifth block in the series is irrelevant, set X=3.
D. Set Y equal to floor(log base 2(X)).
E. If Y>0: Store Y binary 1s in the next RAM bits. Set $X=X-2^{\wedge}Y$. Return to step D.
F. Store a binary 0 in the next RAM bit.
G. Move to the next block that, in step C, was determined to be different (in terms of selection) than the current block. For example, in the example mentioned in Step C, move to the fifth block. Call this the current block, and return to step B. This process creates a sequence of binary data Analysis Interface for Selective Storage:

A goal of forensic imaging is to enable collected data to be analyzed, presented, or otherwise read or accessed. Since the image collected and/or stored in accordance with aspects of the invention may be incomplete as compared to the original data source, subsequent data access may need to be modified for the storage device to use partial data. In situations where this is not desirable, the partial data can be presented as complete data using a conventional adapter interface. If the access system tries to access data that has not been collected, the adapter may create an error, indicate that the data was not collected, indicate that the data or data source was bad or corrupt, or return a known dummy value, such as binary zeroes. Likewise, a tool may convert a partial image into a full image, filling in dummy values or indicators of bad data or missing data for locations that were not collected.

Verification of Selective Storage:

Once a conventional forensic image is completed its accuracy may be verified and safety measures may be put into place to ensure that the image is not altered or otherwise tampered with in the future. Typically this involves computing a hash (a relatively short sequence of bits, whose value depends on every bit in the image or the data source) of both the data source and of the image stored on the storage device, then comparing the two. If they match, then the accuracy of the image is verified. This method works with conventional imaging because conventional imaging duplicates the entire drive. Ensuring that the image is not altered or otherwise tampered with in the future involves calculating a hash of the entire image and securely storing the hash for later verification. The integrity of the image can be verified by recalculating the hash and matching it to the existing hash. If the two match, then the image has not been altered.

Since the image collected and/or stored in accordance with aspects of the invention may be incomplete as compared to the original data source, conventional methods for verifying accuracy may need to be modified accordingly. Options for ensuring the integrity of the image include:

1. Computing the hash over the data that was collected, skipping the parts that were not collected;
2. Computing the hash over the data that was collected, inserting known dummy values (such as sequences of zeroes) in place of data that was not collected; and/or,
3. Providing a list of locations or identifiers of data that were collected or not collected (e.g. using a block map). This list can be stored along with a hash. Alternatively, a hash of this list can be calculated and stored with the image hash.

As with conventional verification, the hash can be recomputed to verify the integrity of the image. The hash of the original data source can likewise be calculated using any of the above procedures, and compared to the hash of the image to ensure that the image is an accurate copy. Alternatively, conventional piecewise hashing, and other gap tolerant hashing can be used to verify the selective storage.

Figure 2:
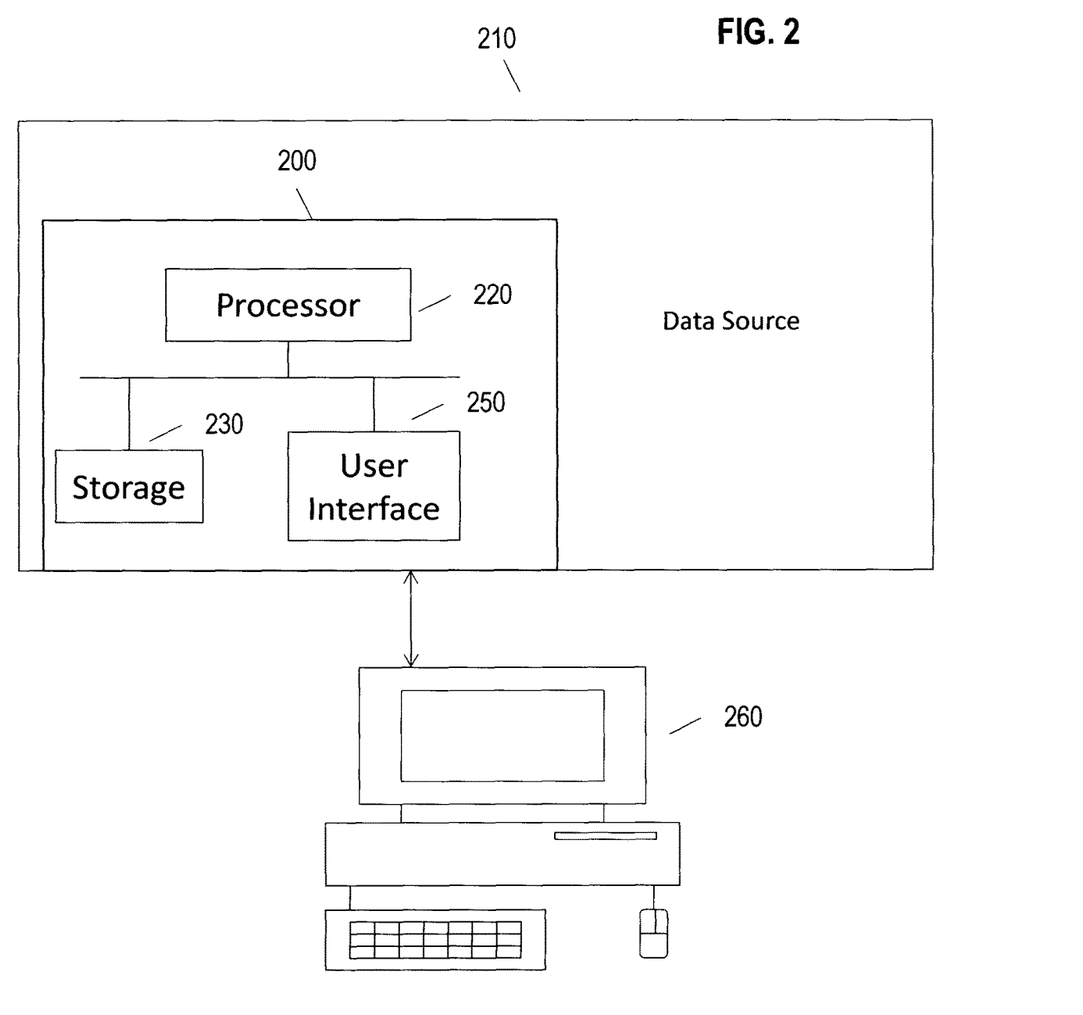
FIG. 2 is a diagram of a forensic imaging device in accordance with one or more embodiments of the invention.

FIG. 2 illustrates an apparatus configured to perform forensically sound imaging in accordance with aspects of the invention. In a preferred embodiment an agent 200 is configured to collect and store relevant data from a data source 210 onto a storage device 230 (which may be the same as the data source, an adjunct storage device connected to the data source and/or a remote storage device). When the agent duplicates blocks from the storage device 230, it may either store them locally, store them in volatile memory, store them in nonvolatile storage, store them on their original storage device (typically in a different location), store them on a different storage device, copy them to another device, transmit them over the network, or use any other means to preserve, duplicate, archive, record, or share them 450. Likewise, some embodiments may allow the agent to preserve them not by duplicating them, but by simply marking them as to be preserved, or instructing another system to preserve them 450. Those skilled in the art will recognize that while FIG. 2 illustrates agent 200 as being software loaded on the data source and the downloaded software instructing the data source to operate in accordance with aspects of the invention aspects of the invention may be realized in a software controlled processor on a different device which is connected to the data source via a forensic write blocker with appropriate adapters and connectors, via a network, such as a local area network (LAN), virtual private network (VPN), wide area network (WAN), or the Internet. For ease of explanation the following description will be limited to a software based agent 200 that resides on the data source, which receives commands typically from a remote manager device, however, those skilled in the art will recognize that the description is also applicable to the other embodiments mentioned and one skilled in the art could easily discern from the description how it would apply to other embodiments.

The agent 200 may include, have access to and/or be provided with some or all of the following stored information: the standard location and format of typical volume, partition, and filesystem data and Metadata (including NTFS, FAT, ext2, ext3, ext4, ZFS and other filesystems in use on computers). Data store metadata includes Master Boot Record, partition tables, partition maps, disk label, filesystem metadata, File Allocation Table (FAT), FAT Boot Sector, FAT32 FSINFO, directory files, NTFS Master File Table (MFT), MFT entries, $MFT File, $MFTMirr file, $Boot file, $Volume file, $Bitmap file, directory indexes, filesystem journals, etc. and instructions for how to parse the same, hashing and sampling methods, and hashes, samples, and summaries of data typically found on data sources; data formats and file formats, including instructions for how to parse and analyze such formats, determine characteristics or location of the data or files, and whether they should be expected to be relevant or not; common investigation or usage scenarios and their typical data of interest and the ability to determine if data is likely to be of interest or not—for example, lists of file extensions or folder names and the data typically found in them; and, the ability to configure or create new scenarios or profiles or definitions of relevant data. Additional location and parsers can be provided to the agent. The agent receives commands via an application programmer's interface (API), via hypertext transfer protocol (HTTP)/representational state transfer (REST) or any other appropriate interface.

The following is a non-limiting example of the operation of an agent in accordance with the invention. The agent receives one or more commands to collect and duplicate one or more blocks on the data source:

1. Reads known locations of the data source, which typically contain metadata describing the data on the source. For example, the first sector of a hard drive typically contains important metadata describing the data on the drive.
2. Copies and stores the data found in these known locations. For each data stored, the original location of the data in the source is stored as well, and associated with the data.
3. Analyzes the contents of the data at these known locations, and uses it to find the location of other metadata of interest (e.g. there is a list of criteria applicable to files, the agent uses filesystem metadata to determine which files meet those criteria, duplicates all blocks of such filesystem metadata that it reads, then duplicates all blocks referenced by that metadata (i.e. the blocks which have the files' data).
4. Reads the data at these other locations.
5. Copies and stores such data. For each data stored, the original location of the data in the source is stored as well, and associated with the data.
6. (Optional) Analyzes such data to find further metadata, repeating steps 3, 4, 5 and 6 any number of times. For example, the NTFS MFT (Master File Table) may be found, copied, and analyzed accordingly.

Alternatively or in addition to the above, the agent may be commanded to:

1. Determine which blocks are currently, or ever were, allocated or used by the computer. This can be determined by simply assuming the entire range in between the first known used block and last known used block was at one point in use, by examining filesystem metadata, by reversing the operating filesystem's allocation algorithm, by searching, by sampling, or by a combination of these.
2. Add these block numbers to a queue.
3. (Optional) Remove from the queue any block numbers which are expected to be forensically irrelevant.
4. Collect and image the block numbers remaining in the queue.

This second example will collect more data than the first, thus it is more thorough, but as a result it is also slower.

Still another alternative or addition is to group smaller blocks into larger blocks (e.g. group sectors into 16 MB sectors), as the AFF format already does, and collecting an entire block when any of its smaller inclusive blocks are selected. Each block is either identical to its counterpart in a traditional image, or completely absent. In general, this selective storage may be implemented by using any format that allows inclusion of the block number of a block or group of blocks and allows omission of some of these blocks or groups of blocks.

In one or more embodiments, the agent may receive one or more commands 430, which provides a block ID or block IDs to duplicate. The agent may then duplicate the requested blocks or it may duplicate the selected blocks and some additional blocks (e.g., if the command identifies blocks 1000-1250 and 1300-4000, the agent may also duplicate blocks 1251-1299. Additionally or alternatively it may duplicate one or more blocks with ids lower than 1000 and/or higher than 4000.

In one or more embodiments, the agent may receive one or more commands 430, which identifies certain types of data, certain types of blocks, properties of the data or blocks, and/or a request to preserve all blocks necessary to perform an operation or answer a particular query (e.g. preserve all blocks necessary to locate and present a particular Word document "employee.docx". The agent then employs one or more of the above described techniques to locate 440 and duplicate the requested data and possibly additional data 450.

Thus it is seen that apparatus and methods are provided for performing a forensic digital investigation. Although particular embodiments have been disclosed herein in detail, this has been done for purposes of illustration only, and is not intended to be limiting with respect to the scope of the claims, which follow. In particular, it is contemplated by the inventor that various substitutions, alterations, and modifications may be made without departing from the spirit and scope of the invention as defined by the claims. For example, but in no way exhaustive, rather than examining the metadata for relevant data, the metadata can be analyzed to find all unused space and then everything that is not unused space could be duplicated. Another non-exhaustive example is that an operator may manually select data to add to the duplication. Other aspects, advantages, and modifications are considered to be within the scope of the following claims. The claims presented are representative of the inventions disclosed herein. Other, unclaimed inventions are also contemplated. The inventors reserve the right to pursue such inventions in later claims.

Insofar as embodiments of the invention described above are implemented, at least in part, using a computer system, it will be appreciated that a computer program for implementing at least part of the described methods and/or the described apparatus is to envisaged as an aspect of the invention. The computer system may be any suitable apparatus, system or device, electronic, optical, or a combination thereof. For example, the computer system may be a programmable data processing apparatus, a computer, a Digital Signal Processor, an optical computer or a microprocessor. The computer program may be embodied as source code and undergo compilation for implementation on a computer, or may be embodied as object code, for example.

It is also conceivable that some or all of the functionality ascribed to the computer program or computer system aforementioned may be implemented in hardware, for example by one or more application specific integrated circuits and/or optical elements. Suitably, the computer program can be stored on a carrier medium in computer usable form, which is also envisaged as an aspect of the invention. For example, the carrier medium may be solid-state memory, optical or magneto-optical memory such as a readable and/or writable disk for example a compact disk (CD) or a digital versatile disk (DVD), or magnetic memory such as disk or tape, and the computer system can utilize the program to configure it for operation. The computer program may also be supplied from a remote source embodied in a carrier medium such as an electronic signal, including a radio frequency carrier wave or an optical carrier wave.

It is accordingly intended that all matter contained in the above description or shown in the accompanying drawings be interpreted as illustrative rather than in a limiting sense. It is also to be understood that the following claims are intended to cover all of the generic and specific features of the invention as described herein, and all statements of the scope of the invention which, as a matter of language, might be said to fall there between.

Having described the invention, what is claimed as new and secured by Letters Patent is:

1. A method for improving performance of a forensic investigation of a data source, wherein said data source is divided into a plurality of blocks, wherein a data is stored in at least one of said plurality of blocks and another data is stored in at least one other of said plurality of blocks, the method comprising:
associating an agent with said data source;
said agent monitoring said data source for file access;
said agent receiving at least one command to perform at least one forensic operation on the data source;
said agent, in response to receiving said at least one command, determining at least one block which may contain said data;
wherein said determining includes identifying said at least one block of said data source as being the at least one block which may contain said data, based on said monitoring of said data source for file access determining that said at least one block of said data source has been accessed;
wherein said at least one other of said plurality of blocks was not accessed and,
said agent performing said forensic operation on only said accessed at least one block and not performing said forensic operation on said at least one other of said plurality of blocks.

2. The method according to claim 1 wherein said forensic operation includes marking the accessed at least one block for copying.

3. The method according to claim 1 wherein said forensic operation includes copying the accessed at least one block to a storage device associated with said agent.

4. The method according to claim 3 wherein said storage device is located remote from said data source.

5. The method according to claim 3 wherein said copying said the accessed at least one block includes copying information sufficient to identify a location, a position or an identifier of said block.

6. The method according to claim 3 further comprising copying at least one additional block containing metadata related to said accessed data.

7. The method according to claim 6 wherein said metadata is part of a filesystem metadata that catalogs data stored on the data source.

8. The method according to claim 6 wherein said metadata is part of a filesystem metadata that associates blocks with data.

9. The method according to claim 1 further including the agent determining a plurality of blocks which may contain the data;
wherein the determining includes monitoring an access to the plurality of blocks of the data source; and,
the agent performing the forensic operation on only the accessed plurality of blocks.

10. The method according to claim 1, wherein said monitoring for access includes creating an interface through which said access to said data source occurs.

11. The method according to claim 1 wherein said command is received from a remote manager via a network.

12. The method according to claim 1 wherein said at least one block which may contain said data includes a plurality of contiguous sectors.

13. The method according to claim 1 where said at least one command includes an information criteria and the information criteria includes criteria sufficient to identify data belonging to at least one file.

14. The method according to claim 13 wherein said information criteria includes criteria sufficient to identify data belonging to a plurality of files.

15. A method for improving a speed of a preservation of at least a portion of a data source, wherein the data source is separated into a plurality of blocks, the method comprising:
associating an agent with said data source; said agent receiving an information criteria;
said agent, in response to receiving said information criteria, identifying a data stored on at least one block of said data source;
wherein said identifying a data includes detecting access to said at least one block of said data source;
wherein at least one other of said plurality of blocks is not accessed;
said agent copying only said identified accessed at least one block to a storage device and not copying said at least one other of said plurality of blocks that is not accessed.

16. The method according to claim 15 wherein said storage device is located remote from said data source.

17. The method according to claim 15 wherein said only copying said accessed at least one block includes copying information sufficient to identify a location, a position or an identifier of said at least one block.

18. The method according to claim 15 further comprising copying at least one additional block containing metadata related to said identified data.

19. The method according to claim 18 wherein said metadata is part of a filesystem metadata that catalogs data stored on the data source.

20. The method according to claim 18 wherein said metadata is part of a filesystem metadata that associates blocks with data.

21. The method according to claim 15 wherein said identifying a data includes detecting access to a plurality of blocks of said data source and wherein said agent copying the plurality of said accessed blocks.

22. The method according to claim 21, wherein said monitoring said access includes creating an interface through which said access to said data source occurs.

23. The method according to claim 15 wherein said information criteria is received from a remote manager via a network.

24. The method according to claim 15 wherein said at least one block includes a plurality of contiguous sectors.

25. The method according to claim 15 wherein said information criteria includes criteria sufficient to identify data belonging to at least one file.

26. A method for improving a speed of identifying, on at least a portion of a data source that is separated into a plurality of blocks, blocks which contain data responsive to an information criteria, wherein said data source includes an interface, the method comprising:
subsequent to identifying said information criteria, providing an agent to monitor access to said blocks;
said agent detecting as a result of the monitoring, access to at least two of the plurality of blocks;
wherein at least one other of said plurality of blocks is not accessed; and
identifying at least one of the at least two of the plurality of said accessed blocks as containing data responsive to said information criteria and not identifying the at least one other of said plurality of blocks as containing data responsive to said information criteria.

27. The method according to claim 26 wherein said at least one of the plurality of said accessed blocks includes all of said accessed blocks.

28. The method according to claim 26, further including creating an agent interface through which said access to said data source occurs.

29. The method according to claim 28 wherein said agent interface acts as a proxy for said interface of said data source.

30. The method according to claim 26 wherein said monitoring includes modifying said interface.

31. The method according to claim 30 wherein said modifying said interface includes connecting an instrument to said interface.

32. The method according to claim 30 wherein said modifying said interface includes making alterations to said interface which enable tracking of said interface.

33. The method according to claim 28 wherein said creating an agent interface includes writing a new filesystem access code; wherein said new access code identifies at least one block that contains data which satisfies the criteria, and at least one other block used to determine that said data satisfies the criteria.

34. The method according to claim 33 wherein said new access code identifies at least another block used to locate the at least one block and the at least one other block.

35. The method according to claim 33 wherein said new access code identifies at least another block used to interpret the at least one block and the at least one other block.

36. The method according to claim 33 wherein said at least one block that contains data which satisfies the criteria belongs to a file and said at least one other block used to determine that said data satisfies the criteria belongs to a filesystem metadata.

37. A method for improving a speed of preservation of at least a portion of a data source, wherein the data source is separated into a plurality of blocks, and wherein said data source includes an interface, the method comprising:

identifying information criteria;

subsequent to identifying said information criteria, providing an agent to monitor access to said plurality of blocks;

wherein at least one of the plurality of blocks is not accessed; and, said agent, based on said monitoring, determining that a plurality of blocks are accessed and identifying said plurality of accessed block as containing data responsive to the information criteria and duplicating all accessed blocks and not duplicating the at least one of the plurality of blocks that is not accessed.

38. The method according to claim 37, further including creating an agent interface through which said access to said data source occurs.

39. The method according to claim 37 wherein said agent interface acts as a proxy for said interface of said data source.

40. The method according to claim 37 wherein said monitoring includes modifying said interface.

41. The method according to claim 40 wherein said modifying said interface includes connecting an instrument to said interface.

42. The method according to claim 40 wherein said modifying said interface includes making alterations to said interface which enable tracking of said interface.

43. The method according to claim 38 wherein said creating an agent interface includes writing a new filesystem access code; wherein said new access code duplicates at least one block that contains data which satisfies the criteria, and at least one other block used to determine that said data satisfies the criteria.

44. The method according to claim 43 wherein said new access code duplicates at least another block used to locate the at least one block and the at least one other block.

45. The method according to claim 43 wherein said new access code duplicates at least another block used to interpret the at least one block and the at least one other block.

46. The method according to claim 43 wherein said at least one block that contains data which satisfies the criteria belongs to a file and said at least one other block used to determine that said data satisfies the criteria belongs to a filesystem metadata.

* * * * *